(12) United States Patent
Yamauchi et al.

(10) Patent No.: US 7,248,780 B2
(45) Date of Patent: Jul. 24, 2007

(54) REPRODUCING DEVICE, MEDIUM, INFORMATION AGGREGATE, TRANSMITTING MEDIUM, AND RECORDING MEDIUM

(75) Inventors: Kenichiro Yamauchi, Kyoto (JP); Junichi Komeno, Osaka (JP); Yoshitaka Yaguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1291 days.

(21) Appl. No.: 09/822,107

(22) Filed: Mar. 30, 2001

(65) Prior Publication Data
US 2002/0003942 A1  Jan. 10, 2002

(30) Foreign Application Priority Data
Mar. 30, 2000  (JP)  ............................. 2000-094894

(51) Int. Cl.
*H04N 5/91* (2006.01)
(52) U.S. Cl. ........................................ 386/68; 386/112
(58) Field of Classification Search ................. 386/46, 386/68, 70, 125, 111
See application file for complete search history.

(56) References Cited

U.S. PATENT DOCUMENTS

| | | | |
|---|---|---|---|
| 5,568,274 A | 10/1996 | Fujinami et al. | |
| 5,596,581 A | 1/1997 | Saeijs et al. | |
| 5,726,989 A | 3/1998 | Dokie | |
| 5,740,307 A | 4/1998 | Lane | |
| 5,793,927 A | 8/1998 | Lane | |
| 5,801,781 A * | 9/1998 | Hiroshima et al. | ......... 348/441 |
| 5,923,812 A | 7/1999 | Sakazaki et al. | |
| 6,031,960 A | 2/2000 | Lane | |
| 6,034,731 A | 3/2000 | Hurst, Jr. | |
| 6,414,999 B1 * | 7/2002 | Igi et al. | ................ 375/240.26 |
| 6,628,890 B1 * | 9/2003 | Yamamoto et al. | ........... 386/68 |

FOREIGN PATENT DOCUMENTS

| | | |
|---|---|---|
| EP | 0 897 245 A | 2/1999 |
| JP | 11-18051 | 1/1999 |

* cited by examiner

*Primary Examiner*—Huy Nguyen
(74) *Attorney, Agent, or Firm*—RatnerPrestia

(57) ABSTRACT

A reproducing device has an input means for inputting an MPEG transport stream from a hard disk; and reproducing means for reproducing the inputted MPEG transport stream, in case of reproducing a special reproduction image, the input means extracts an MPEG transport stream from an arbitrary position to another arbitrary position in the inputted MPEG transport stream to output the special reproduction image used for special reproduction, and the reproducing means reproduces the special reproduction image while detecting whether a plurality of pieces of picture data exist in one of MPEG transport packets constituting the outputted special reproduction image.

8 Claims, 11 Drawing Sheets

REPRODUCING DEVICE, MEDIUM, INFORMATION AGGREGATE, TRANSMITTING MEDIUM, AND RECORDING MEDIUM

BACKGROUND OF THE INVENTION

1. Field of the Invention

The present invention relates to a reproducing device that extracts a necessary image from a picture stream to generate special reproduction data and so on, a medium, an information aggregate, a transmitting medium, and a recording medium.

2. Related Art of the Invention

Special reproduction such as cue and review as well as normal-speed reproduction is performed on AV data, which is recorded in a recording medium such as a hard disk and is generated based on an MPEG transport stream.

Such special reproduction is performed as follows: namely, when recording AV data in a hard disk, pointer information is prepared so as to have access to AV data used for special reproduction, and the pointer information is also recorded when recording the AV data. And then, upon special reproduction, access is made to AV data for special reproduction based on the pointer information, and an MPEG transport stream for special reproduction is generated.

In other words, when special reproduction is performed on AV data recorded in a hard disk, it is necessary to select pictures for special reproduction from AV data.

Referring to FIGS. 10 and 11, the following will describe an image processing device for generating special reproduction data. The image processing device includes a conventional reproducing device which selects pictures for special reproduction as described above from AV data recorded in a hard disk.

FIG. 10 is a block diagram showing the configuration of a conventional image processing device 80.

The image processing device 80 is configured by a readout device 88, a first converting section 83, a buffer 84, a picture processing section 85, a second converting section 86, and an output section 87.

The readout device 88 is a means of reproducing and outputting MPEG transport packets for special reproduction according to pointer information, from the DISK ACCESS UNIT configured by a plurality of MPEG transport streams to generate special reproduction data from AV data stored in a hard disk.

The first converting section 83 is a means of removing a header from a transport packet of a selected picture and making a conversion to an elementary stream.

The buffer 84 is a buffer for accumulating converted elementary streams and FIFO with a capacity for storing at least several tens of packets.

The picture processing section 85 is a means of performing processing such that a converted elementary stream matches MPEG grammar.

The second converting section 86 is a means of adding a header to a processed elementary stream and making a conversion to an MPEG transport stream.

The output section 87 is a means of outputting an MPEG transport stream for special reproduction.

Next, the following will describe the operation of the foregoing conventional image processing device 80.

FIG. 11 shows the steps of generating special reproduction data in the image processing device 80. In the image processing device 80, MPEG transport streams are converted to MPEG elementary streams, elementary streams for special reproduction are generated and accumulated in the buffer, and then, the elementary streams are converted to MPEG transport streams for special reproduction.

Namely, the readout device 88 reproduces pictures for special reproduction for each MPEG transport packet of an original MPEG2 transport stream from which special reproduction data is generated, by using pointer information recorded in a hard disk. For example, in the case where normal reproduction displays 30 pictures per second, in case of sixfold-speed special reproduction, pictures for special reproduction are selected every five pictures for each transport packet unit in a DISK ACCESS UNIT.

The first converting section 83 removes a header from a selected transport packet and makes a conversion to an elementary stream.

The buffer 84 accumulates converted elementary streams.

The picture processing section 85 performs a processing such that the converted elementary stream matches MPEG grammar.

The second converting section 86 adds a header to a processed elementary stream and makes a conversion to an MPEG transport stream.

The output section 87 outputs an MPEG transport stream for special reproduction.

As described above, the conventional image processing device 80 generates special reproduction data.

However, to generate special reproduction data, the conventional readout device 88 has access to pictures for special reproduction from MPEG transport streams for each transport packet in a DISK ACCESS UNIT. Therefore, a plurality of pictures may be included in a single transport packet.

Namely, a picture other than a picture for special reproduction may be included at the front end or the rear end of a packet. Such picture data other than a special reproduction image is displayed as image noise.

Such a problem can be solved by the picture processing section 85 according to the conventional art. However, when a transport stream is converted to an elementary stream, it is quite difficult to decide whether image data is noise or not unless the configuration of the elementary stream is carefully observed and a data size is checked.

SUMMARY OF THE INVENTION

The object of the present invention is to provide a reproducing device, a medium, an information aggregate, a transmitting medium and a recording medium that do not cause noise even when extracting a specific picture from AV data recorded in a hard disk, considering that noise appears when a specific picture is extracted from AV data recorded in a hard disk to generate special reproduction data.

Further, the object of the present invention is to provide a reproducing device, a medium, an information aggregate, a transmitting medium and a recording medium that can readily decide whether image data is noise or not, considering that it is quite difficult to decide whether image data is noise or not when a transport stream is converted to an elementary stream to generate special reproduction data.

One aspect of the present invention is a reproducing device comprising:

input means of inputting an MPEG transport stream from a hard disk; and reproducing means of reproducing the inputted MPEG transport stream, wherein in case of reproducing a special reproduction image, the input means extracts an MPEG transport stream from an arbitrary position to another arbitrary position in the inputted MPEG transport stream to output the special reproduction image used for special reproduction, and the reproducing means reproduces the special reproduction image while detecting whether a plurality of pieces of picture data exist in one of MPEG transport packets constituting the outputted special reproduction image.

Another aspect of the present invention is the reproducing device further comprising packet editing means of replacing picture data other than the picture used for special reproduction with dummy data and outputting the data in case of reproducing a special reproduction image, if a front half of an MPEG transport packet of the MPEG transport packets constituting the special reproduction image, in which a plurality of pieces of picture data is detected by the reproducing means, includes the picture data other than the picture used for special reproduction.

Still another aspect of the present invention is the reproducing device further comprising packet editing means of replacing picture data other than the picture for special reproduction with dummy data and outputting the data in case of reproducing a special reproduction image, if a rear half of an MPEG transport packet of the MPEG transport packets constituting the special reproduction image, in which a plurality of pieces of picture data is detected by the reproducing means, includes the picture data other than the picture used for special reproduction.

Yet another aspect of the present invention is the reproducing device further comprising packet editing means of making a replacement with a transport packet in which dummy data is added to the front end of the picture data used for special reproduction and a header of the transport packet is added to a front end of the dummy data and the transport packet in the case of reproducing a special reproduction image, if a rear half of an MPEG transport packet of the MPEG transport packets constituting the special reproduction image, in which a plurality of pieces of picture data is detected by the reproducing means, includes the picture data other than the picture used for special reproduction.

Still yet another aspect of the present invention is the reproducing device wherein the dummy data is one of adaptation stuffing or user data of a header of an MPEG transport packet, stuffing or user data of an MPEG packetized elementary stream, and zero-stuffing of an MPEG elementary stream.

A further aspect of the present invention is a medium comprising a program and/or data for allowing a computer to carry out all or some functions of all or some means of the reproducing device the medium being processible by a computer.

A still further aspect of the present invention is an information aggregate comprising a program and/or data for allowing a computer to carry out all or some functions of all or some means of the reproducing device.

A yet further aspect of the present invention is a transmitting medium for transmitting an MPEG transport stream reproduced in the reproducing device.

BRIEF DESCRIPTION OF THE DRAWINGS

FIG. 6(*b*) is a diagram showing another example of a transport packet before editing and a transport packet after editing according to Embodiment 1 of the present invention.

FIG. 8(*b*) is a diagram showing that a transport packet is stored in the first buffer before processing and the transport packet is formed into two transport packets by increased picture information after processing according to Embodiment 1 of the present invention.

DESCRIPTION OF SYMBOLS

Figure 1:
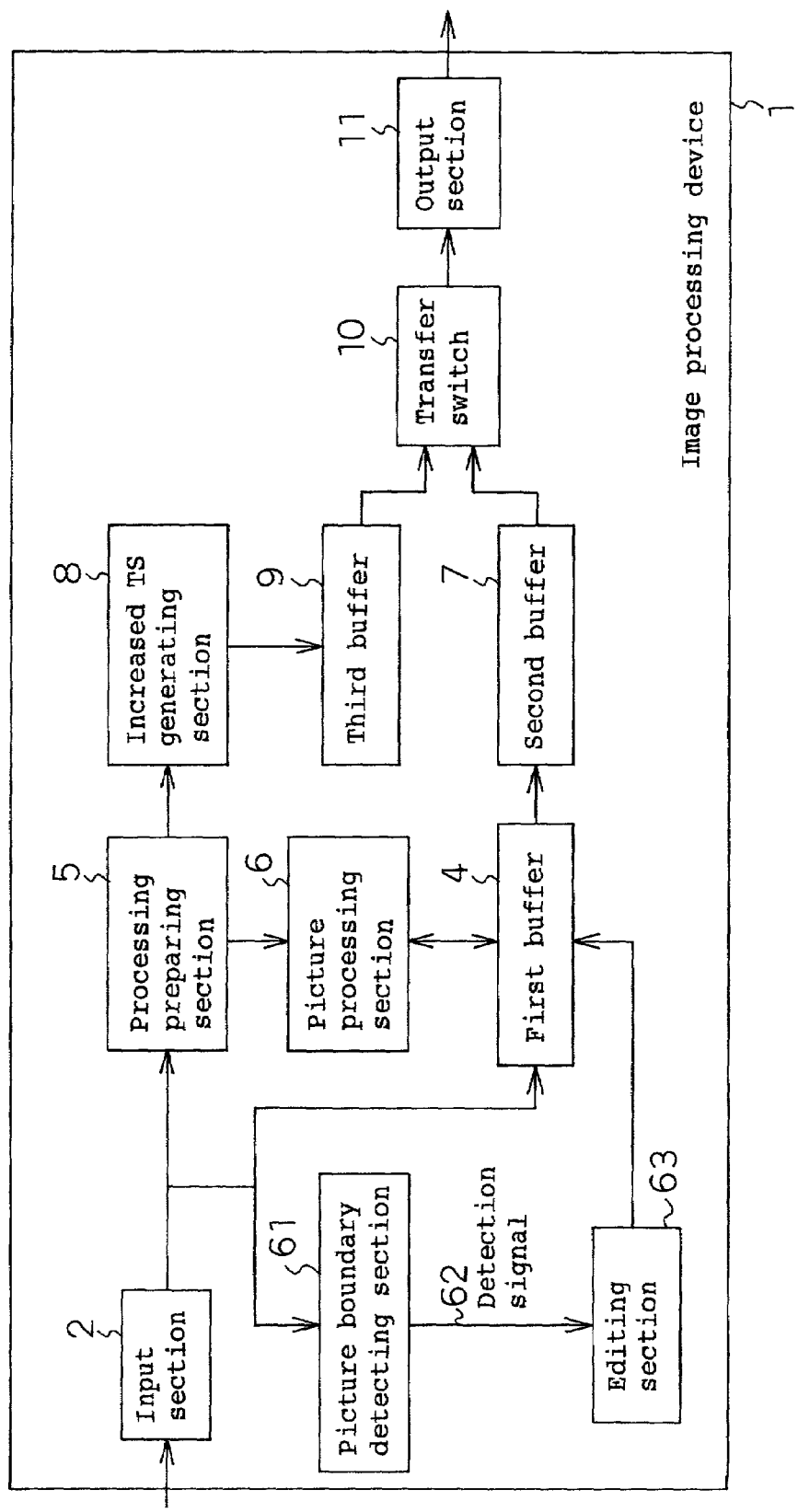
FIG. 1 is a block diagram showing the configuration of an image processing device using a reproducing device according to Embodiment 1 of the present invention.

1 Image processing device
2 Input section
4 First buffer
5 Processing preparing section
6 Picture processing section
7 Second buffer
8 Increased TS generating section
9 Third buffer
10 Transfer switch
11 Output section
12 Reproducing device
21-24 Processing
30, 33, 37, 40, 43 Transport packet
31, 34, 38, 41, 44 Header
32, 35, 39, 42, 45 Image data
36, 46 Dummy data
61 Picture boundary detecting section
63 Editing section
83 First converting section
84 Buffer
85 Picture processing section
86 Second converting section
87 Output section
88 Reproducing device

PREFERRED EMBODIMENTS OF THE INVENTION

Referring to the drawings, the following will discuss an embodiment of the present invention.

Embodiment 1

Embodiment 1 will be firstly discussed.

FIG. 1 is a block diagram showing a configuration of an image processing device 1.

The image processing device 1 is configured by an input section 2, a picture boundary detecting section 61, an editing section 63, a first buffer 4, a processing preparing section 5, a picture processing section 6, a second buffer 7, an increased TS generating section 8, a third buffer 9, a transfer switch 10, and an output section 11.

The input section 2 is a means of selecting pictures for special reproduction in a DISK ACCESS UNIT from AV data generated based on an MPEG transport stream and of inputting the pictures for each MPEG transport packet.

Here, MPEG stands for Motion Picture Expert Group, and MPEG2 is a standard with ISO/IEC standard number 13818.

The picture boundary detecting section 61 is a means of analyzing an MPEG transport packet inputted from the input section 2 and detecting a picture other than a picture for special reproduction in image data included in the transport packet.

The editing section 63 is a means of inserting dummy data in the case where a transport packet accumulated from the input means 2 to the first buffer 4 includes picture data other than picture data for special reproduction.

The first buffer 4 is a buffer for storing a single transport packet.

The processing preparing section 5 is a means of preparing for processing a transport packet.

The picture processing section 6 is a means of processing a stream, which is selected for special reproduction, for each of the transport packets, and matching the MPEG transport stream to MPEG2 grammar.

The second buffer 7 is a buffer for storing a transport packet which has been processed after being stored in the first buffer 4.

The increased TS generating section 8 is a means of generating another transport packet when information about pictures is increased by processing a transport packet.

The third buffer 9 is a buffer for storing an additionally generated transport packet.

The transfer switch 10 is a transfer switch for switching transport packets outputted from the second buffer 7 and the third buffer 9.

The output section 11 is a means of outputting an MPEG transport stream for special reproduction.

Additionally, the input section 2 of this embodiment is an example of an input means of the present invention, the picture boundary detecting section 61 of this embodiment is an example of a reproducing means of the present invention, and the editing section 63 of this embodiment is an example of a packet editing means of the present invention.

The following will discuss the operation of the image processing device 1 according to this embodiment.

Figure 3:
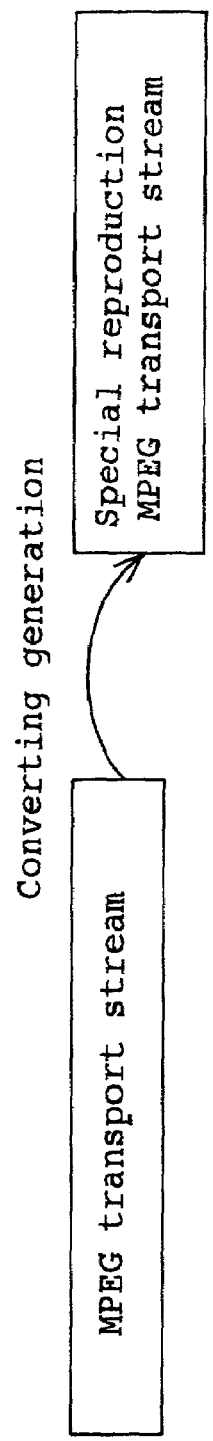
FIG. 3 is a diagram showing the steps of generating special reproduction data in the image processing device according to Embodiment 1 of the present invention.

FIG. 3 shows the steps of generating special reproduction data in the image processing device 1. The image processing device 1 directly converts an MPEG transport stream to an MPEG transport stream for special reproduction without converting an MPEG transport stream to an elementary stream.

Figure 7:
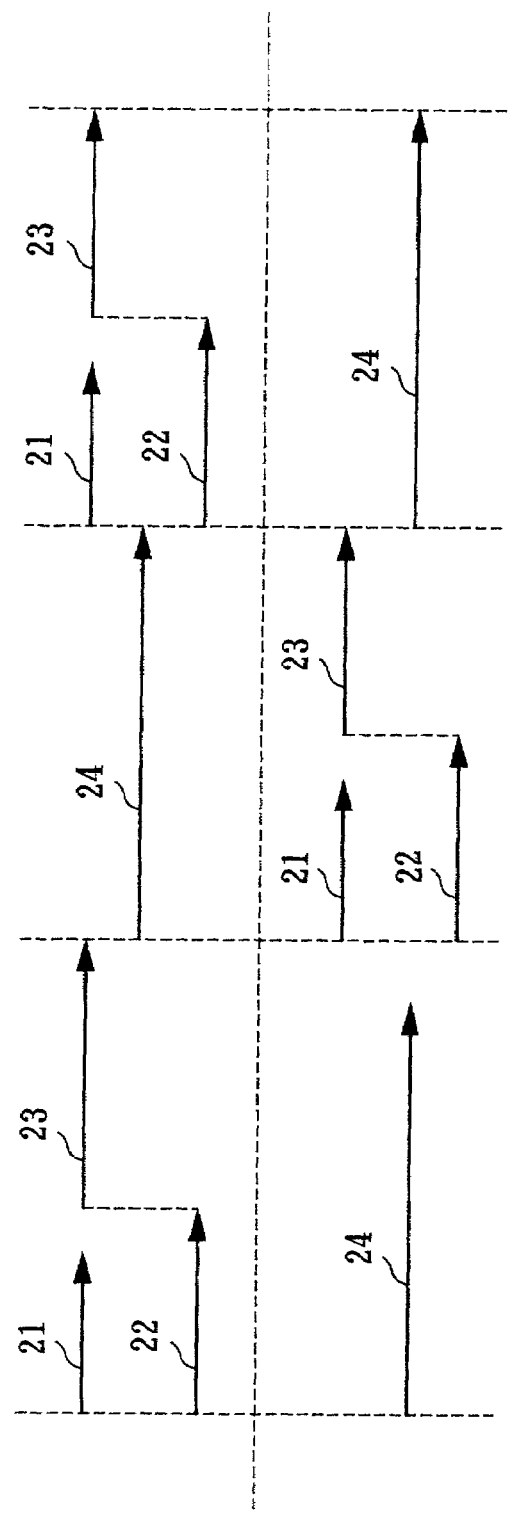
FIG. 7 is a time chart showing that the image processing device generates special reproduction data according to Embodiment 1 of the present invention.

FIG. 7 is a time chart showing the operation of the image processing device 1. In FIG. 7, time elapses from left to right. The image processing device 1 of this embodiment performs a pipeline processing shown in FIG. 7.

First, to generate special reproduction data, the input section 2 extracts an MPEG transport stream from a DISK ACCESS UNIT written in a hard disk.

Figure 2:
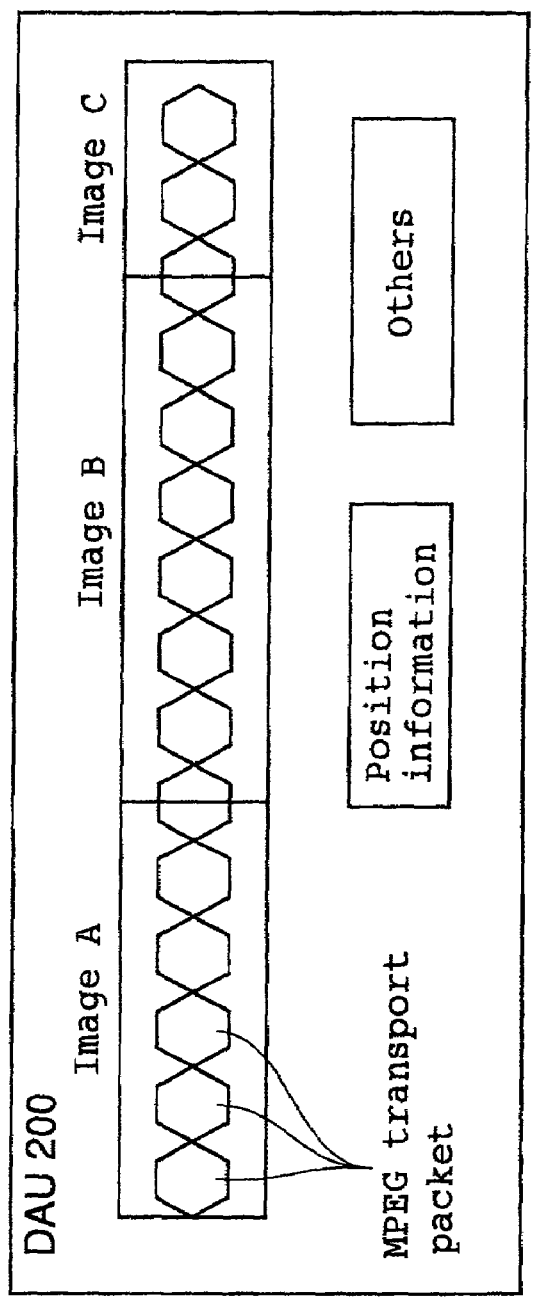
FIG. 2 is a diagram showing the configuration of the DISK ACCESS UNIT according to Embodiment 1 of the present invention.

FIG. 2 shows the configuration of the DISK ACCESS UNIT.

The DISK ACCESS UNIT is configured by a plurality of MPEG transport packets, information on image positions, and other information. A single DISK ACCESS UNIT stores a plurality of pictures configured by MPEG transport streams.

The input section 2 inputs an image for special reproduction as MPEG transport streams from the DISK ACCESS UNIT based on the position information in the DISK ACCESS UNIT and transmits the image to the processing section 5, the picture boundary detecting section 61, and the first buffer 4.

Figure 4:
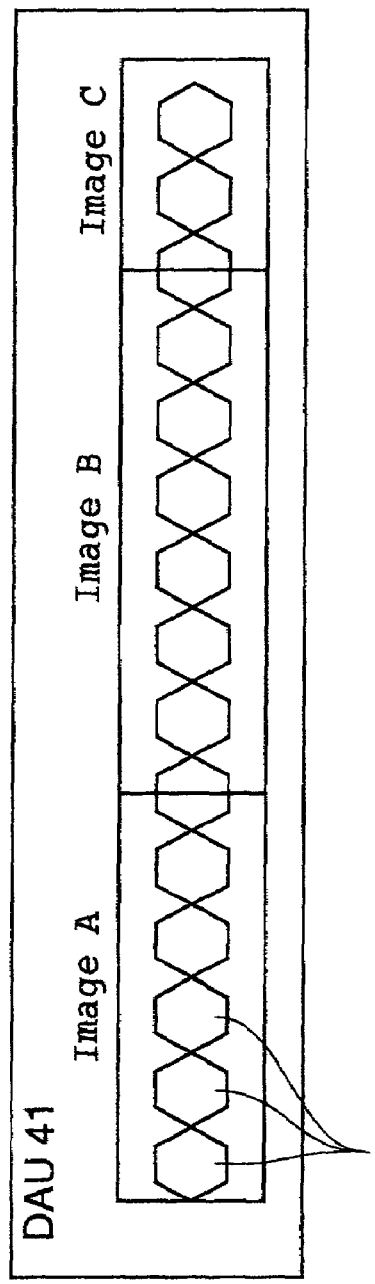
FIG. 4 is a diagram showing an example of the DISK ACCESS UNIT and images recorded in the DISK ACCESS UNIT according to Embodiment 1 of the present invention.

FIG. 4 shows image data stored in the DISK ACCESS UNIT.

The DISK ACCESS UNIT 200 stores three pictures of image A, image B, and image C, and the pictures are each configured by packets of an MPEG transport stream.

In a packet of an MPEG transport stream including a front end of image B, a rear end of image A is included.

In a packet of an MPEG transport stream including a rear end of image B, a front end of image C is included.

In the case where an MPEG image is subjected to special reproduction, it is necessary to randomly extract and reproduce pictures from the DISK ACCESS UNIT. In case of performing fivefold-speed special reproduction on an image which is normally reproduced with 30 frames per second, a single image including an I picture may be extracted every 15 frames and 10 images may be reproduced per second.

The following will describe that an image extracted for generating special reproduction data is image B in this embodiment.

Namely, from the DISK ACCESS UNIT 200, the input section 2 inputs MPEG transport packets of AV data including data of image B and transmits them to the processing section 5, the picture boundary detecting section 61, and the first buffer 4.

Figure 5:
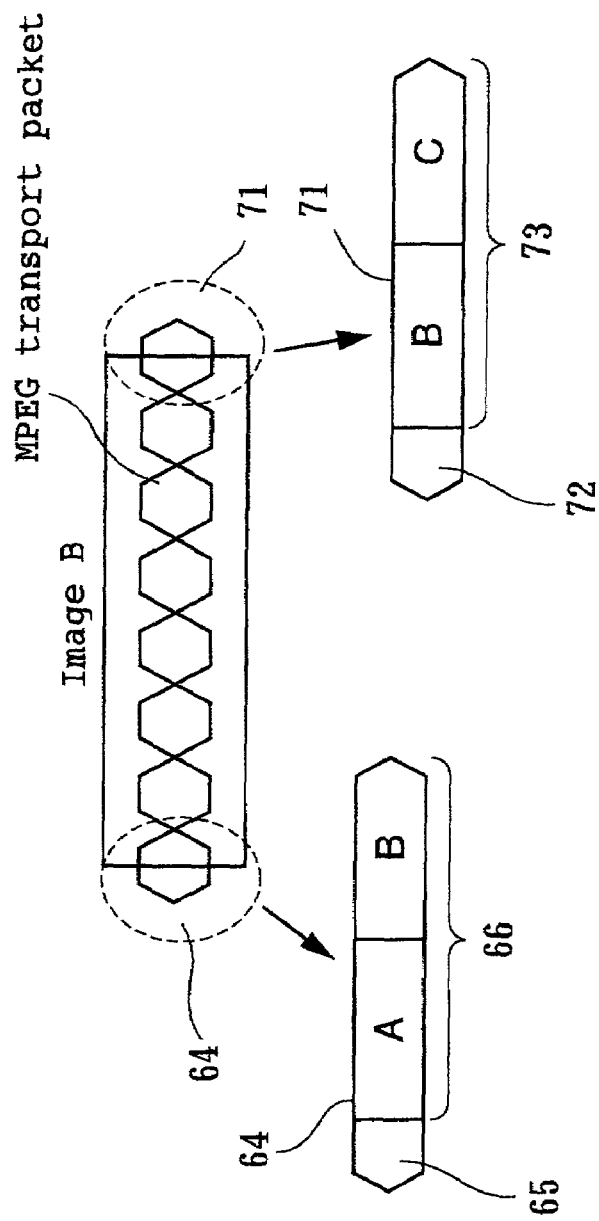
FIG. 5 is a diagram showing an example of an image which is inputted by the image processing device and is recorded in the DISK ACCESS UNIT according to Embodiment 1 of the present invention.

FIG. 5 shows AV data inputted by the input section 2. Namely, in image data 66 of a packet 64 including front end data of image B, the front end of image B and the rear end of image A are included. In image data 73 of a packet 71 including rear-end data of image B, the rear end of image B and the front end of image C are included.

Next, the picture boundary detecting section 61 analyzes the inputted packet and detects a state in which the front end of image B does not start from the front end of the packet and a state in which the front end of another picture is included while the packet of image B is reproduced. And then, the picture boundary detecting section 61 transmits the boundary positions to the editing section 63 as a detection signal 62.

The editing section 63 masks unnecessary image data in the case where the unnecessary image data enters an MPEG transport packet. The detection signal 62 decides whether image data needs to be masked.

In the case where the detection signal 62 indicates that the state where the image A is contained in the portion before the image B of the image data 66 of the transport packet 64 in which the image B is contained, as shown in FIG. 6(a), the editing section 63 changes the portion of the image A to the dummy data 70 among the image data 66 so as to replaces the image data 66 with the image data 69, which only includes the image B, thereby editing the packet 64 into a transport packet 67.

Here, the dummy data 70 is a stuffing byte in an adaptation field of an MPEG transport stream, a stuffing byte in a PES header of a PES packet, and a stuffing byte in a video elementary stream.

Figure 6:
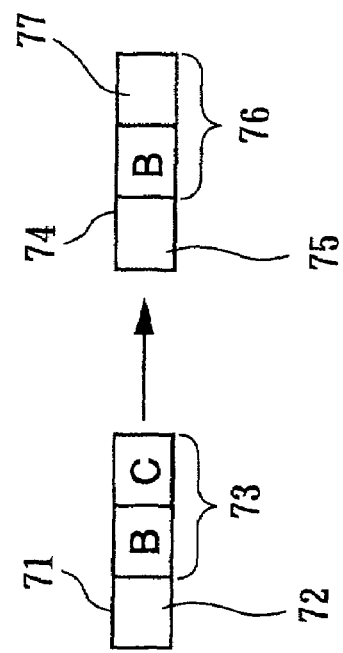
FIG. 6(*a*) is a diagram showing an example of a transport packet before editing and a transport packet after editing according to Embodiment 1 of the present invention.
Figure 6:
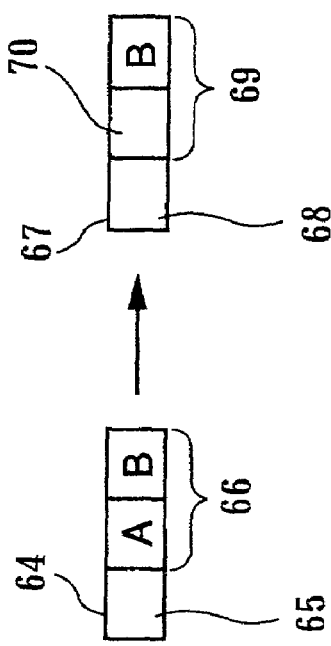

In the case where the detection signal 62 indicates the state where the image C is contained in the back portion from the image B of the image data 73 of the transport packet 71 in which the image B is contained, as shown in FIG. 6(*b*), the editing section 63 changes the portion of the image C to the dummy data 77 among the image data 73 so as to replaces the image data 73 with the image data 76, which only includes the image B, thereby editing the transport packet 71 into a transport packet 75. Here the dummy data 77 is a stuffing byte in an adaptation field of an MPEG transport stream, a stuffing byte in a PES header of a PES packet, and a stuffing byte in a video elementary stream.

The editing section 63 uses the above-mentioned means so as to remove picture data unnecessary for special reproduction when other picture data are included in a packet of pictures stored in the first buffer 4 and used for special reproduction.

In FIG. 7, processing 21 denotes the processing of the input section 2, processing 22 denotes the processing of the picture boundary detecting section 61, and processing 23 denotes the processing of the editing section 63.

Moreover, a series of selected transport packets, which includes specific pictures selected from an MPEG transport packet, does not match MPEG grammar. Namely, information necessary for MPEG grammar is lost, or information unnecessary for special reproduction or information to be rewritten is still added.

What information is lost and what information is unnecessary for special reproduction or needs rewriting will be discussed further later on.

Here, the processing preparing section 5 analyzes the transport packets selected by the picture selecting section 3, finds a part which does not match MPEG grammar, generates information about how to process the transport packets, and conveys the information to the picture processing section 6 and the increased TS generating section 8. In FIG. 7, processing 22 denotes the processing of the processing preparing section 5.

The picture processing section 6 processes a transport packet stored in the first buffer 4. First, when the transport packets include PTS (Presentation Time Stamp) and DTS (Decoding Time Stamp), the PTS is replaced for special reproduction. The processed transport packet is stored in the second buffer 7.

Figure 8:
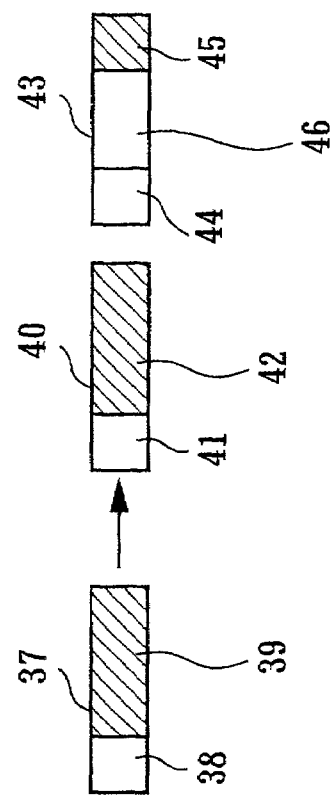
FIG. 8(*a*) is a diagram showing a transport packet stored in a first buffer before processing and a transport packet after processing according to Embodiment 1 of the present invention.
Figure 8:
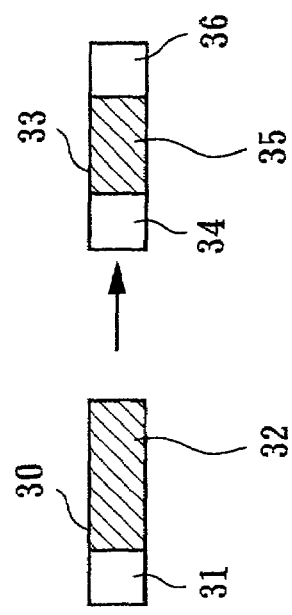

FIG. 8(*a*) shows a transport packet 30 stored in the first buffer 4 before processing and a transport packet 33 after processing. As shown in FIG. 8(*a*), in the case where picture information decreases after processing, dummy data 36 is filled and adjustment is made such that the transport packet is 188 bytes in size.

Figure 9:
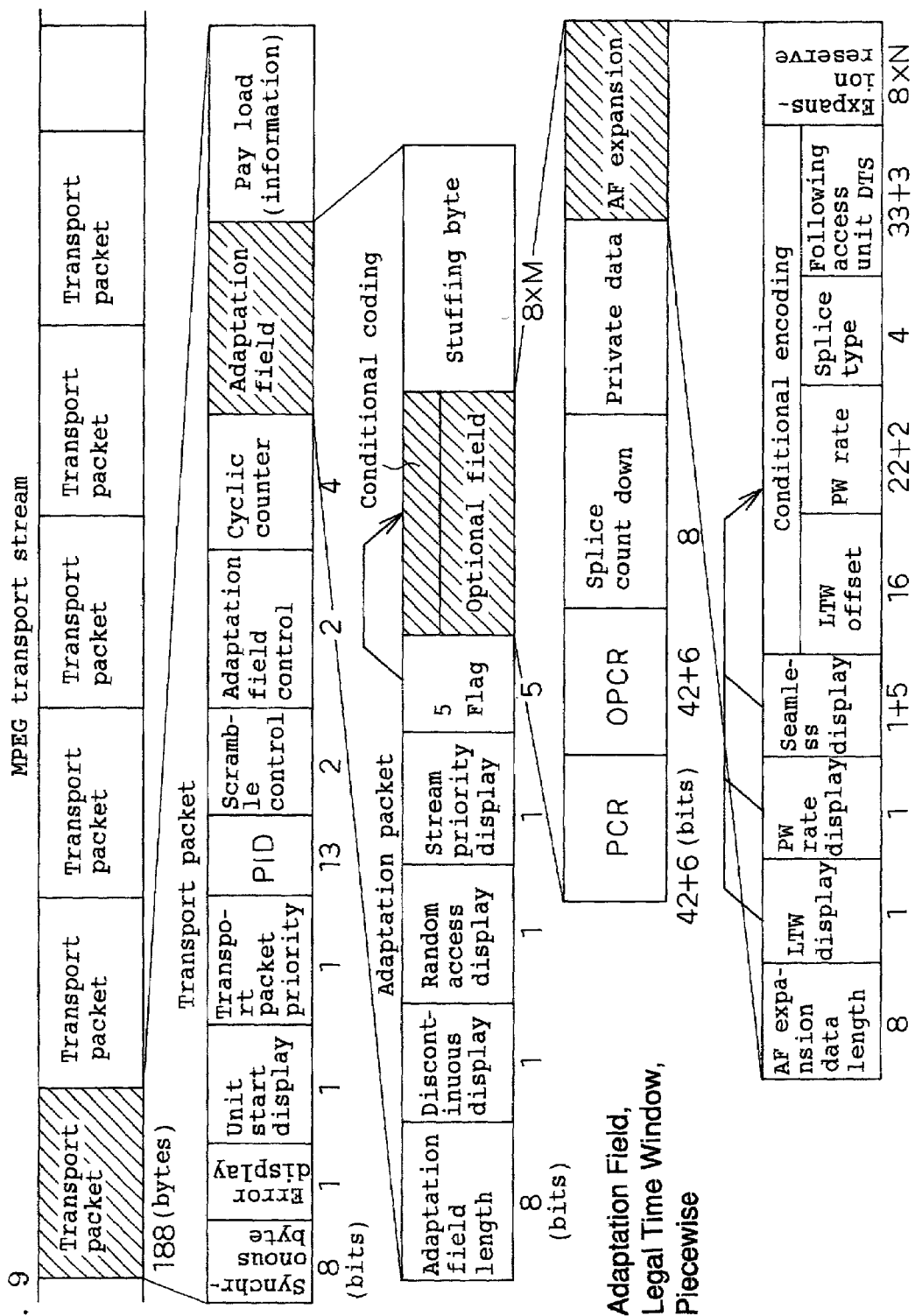
FIG. 9 is a diagram showing a data structure of MPEG transport packets according to Embodiment 1 of the present invention.
Figure 10:
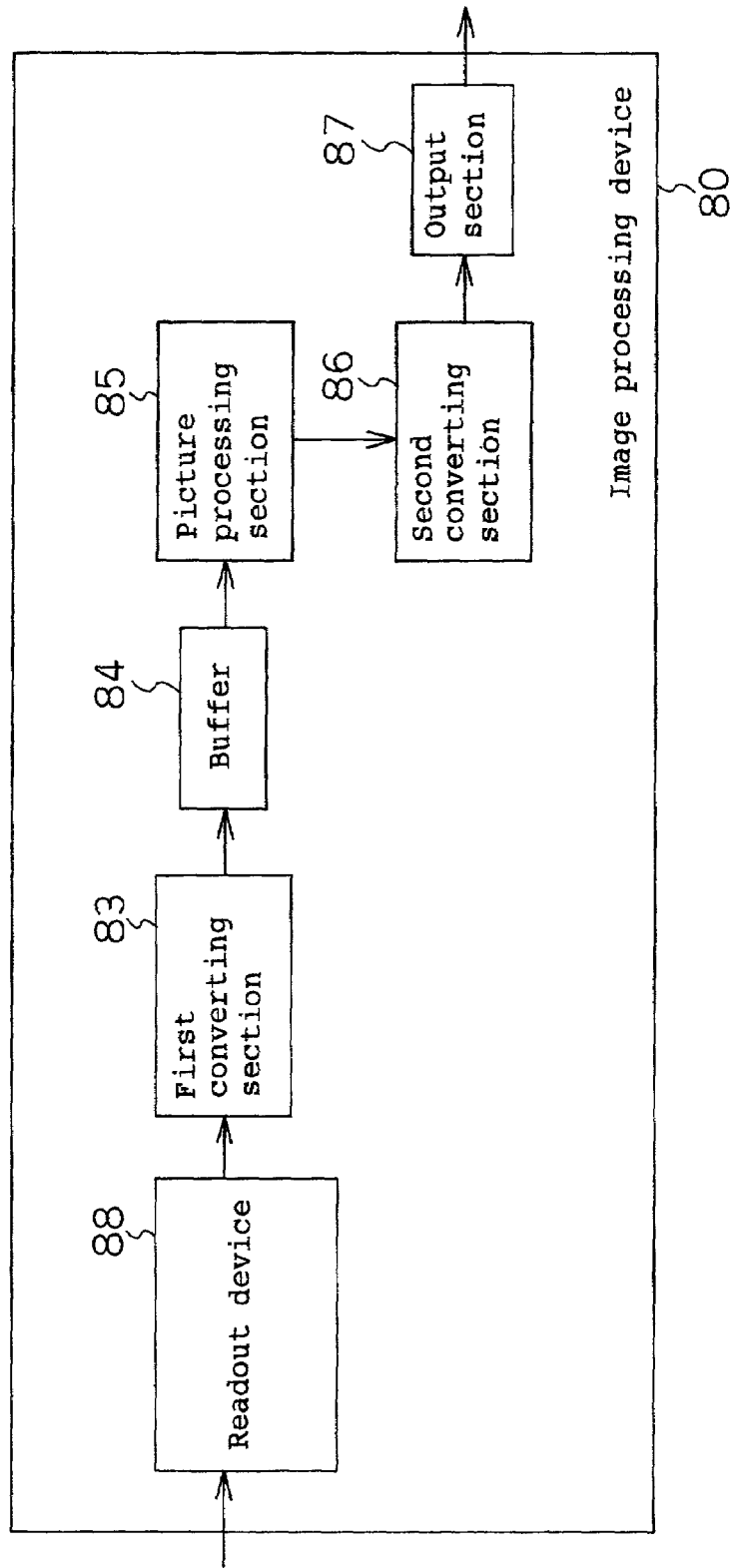
FIG. 10 is a block diagram showing the configuration of an image processing device using a conventional reproducing device.
Figure 11:
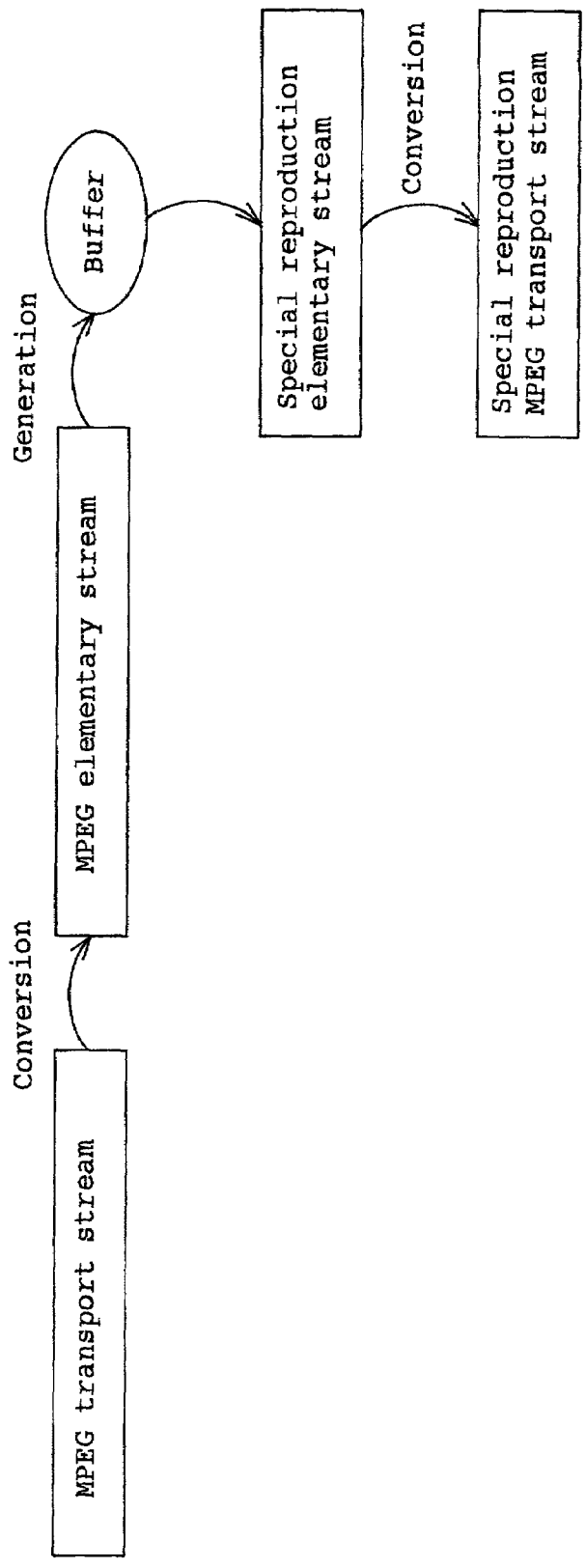
FIG. 11 is a diagram showing the steps of generating special reproduction data in the conventional image processing device.

FIG. 9 shows the data configuration of an MPEG transport packet. The picture processing section 6 turns on a bit indicating the presence or absence of adaptation field of adaptation field control and fills dummy data in a stuffing byte.

In the case where picture information increases after a transport packet is processed, the increased TS generating section 8 generates another transport packet and stores it in the third buffer 9. FIG. 8(*b*) shows that a transport packet 37, which is stored in the first buffer 4 before processing, increases in picture information after processing and is converted to transport packets 40 and 43. The transport packet 37 is a transport packet stored in the first buffer 4 before processing. Further, the transport packet 40 is a transport packet stored in the second buffer 7 after processing. The transport packet 43 is a transport packet additionally generated and stored in the third buffer 9. The increased TS generating section 8 fills dummy data such that additional transport packet is 188 bytes in size. In FIG. 7, processing 23 denotes the processing of the picture processing section 6 and the increased TS generating section 8.

Next, in case of rewriting a DSM flag, one-byte DSM information, and information including DIT, the transfer switch 10 firstly outputs a transport packet from the second buffer 7. And then, after the transport packet is outputted from the second buffer 7, the transfer switch 10 outputs a transport packet stored in the third buffer 9.

Also, in case of rewriting information such as a sequence end flag, PCR, and PSI, the transfer switch 10 firstly outputs a transport packet of the third buffer 9 when the transport packet is stored in the third buffer 9. After the transport packet is outputted from the third buffer 9, the transfer switch 10 outputs a transport packet stored in the second buffer 7.

As described above, the transfer switch 10 switches the order of outputting transport packets stored in the second buffer 7 and the third buffer 9 according to rewritten transport packets.

In response, the output section 11 outputs an MPEG transport stream to the outside of the image processing device 1. Processing 24 denotes the processing of the transfer switch 10 and the output section 11.

If such an image processing device 1 is included in a digital VTR, it is possible to generate special reproduction data when the digital VTR records an MPEG transport stream. Moreover, if the image processing device 1 is included in a hard disk, it is possible to generate an MPEG transport stream for special reproduction when special reproduction is performed on an MPEG2 transport stream recorded in the hard disk.

As earlier mentioned, the following will discuss what information is lost and what information is unnecessary or needs rewriting for special reproduction.

Firstly, PCR (Program Clock Reference) will be discussed. PCR is information for setting a value of STC (System Time Clock) at a value predetermined by an encoder. PCR is conveyed with a transport packet at least every 100 ms. When the picture selecting section 3 selects a transport packet due to special reproduction and so on, PCR may be lost. In such a case, PCR of an original image is masked by the dummy data illustrated in FIG. 8, a transport packet including PCR is generated in the third buffer 9 every 100 ms, and the packet is outputted with interrupting.

Next, PSI (Program Specific Information) will be discussed. PSI is information on program specification, which specifies a program to be selected and a packet to be extracted from an MPEG transport stream and what decoding is necessary. PSI is conveyed as a transport packet having specific PID. Like PCR, PSI is lost when the picture selecting section 3 selects a transport packet. Thus, it is necessary to add a transport packet including PSI for special reproduction, in the same method as PCR.

Moreover, a DSM (Digital Storage Media) flag will be discussed. The DSM flag is information indicative of being different from an original stream. In case of generating special reproduction data, the DSM flag is turned on.

When the DSM flag is turned on, one-byte additional information is included. In this case, the second buffer 7 stores data including the DSM flag and the one-byte additional information, and additional packet is generated in the third buffer 9 to transmit the last byte of the original packet. Subsequently, the transfer switch 10 outputs the packet of the second buffer 7 before outputting the packet of the third buffer 9.

Furthermore, PTS (Presentation Time Stamp) will be discussed. In case of cue, a value of PTS is not useful, so that the PTS needs to be rewritten for special reproduction.

Additionally, a sequence header and a sequence end header will be discussed. The sequence header is indicative of the start of a program and the sequence end header is indicative of the end of the program. They need to be added because these are also lost when a transport packet is selected.

As described above, the image processing device 1 of this embodiment generates special reproduction data directly from an MPEG transport packet without converting an MPEG transport stream to an elementary stream to generate special reproduction data. Hence, it is less likely to lose information on a transmission line that is included in a header of a transport packet.

Further, it is possible to achieve a one-to-one correspondence between an inputted transport packet and an outputted transport packet except for additionally generated transport packets. Thus, special reproduction data can be generated using a buffer with a small capacity.

Additionally, as shown in FIG. 3, the image processing device 1 is operated by a pipeline processing as a whole, so that it is possible to readily change a transfer rate by changing a length of a pipeline.

Moreover, it is possible to achieve a one-to-one correspondence between an inputted transport packet and an outputted transport packet except for additionally generated transport packets. Hence, latency is substantially constant from the time a transport packet is inputted until the time the transport packet is outputted. Even when transport packets are additionally generated, since only several packets are increased and the frequency of increase is not high, latency is not seriously affected.

Here, in this embodiment, although I pictures are selected to generate special reproduction data, the selection is not particularly limited. All or some of I pictures and P pictures may be selected for special reproduction. Further, all or some of P pictures may be selected for special reproduction.

Further, according to the foregoing description, the image processing device 1 of this embodiment generates special reproduction data by a pipeline processing. However, the processing is not particularly limited, so that special reproduction data may be generated without using a pipeline processing.

Moreover, regarding all or some of the means of the reproducing device of the present invention, all or some of the functions may be carried out like software by computer programs or by hardware.

Additionally, a medium as described below also belongs to the present invention: the medium has programs and/or data for allowing a computer to carry out all or some of the functions regarding all or some of the means of the reproducing device of the present invention, and the medium can be processed by a computer.

Additionally, an information aggregate as described below also belongs to the present invention: the information aggregate is programs and/or data for allowing a computer to carry out all or some of the functions regarding all or some of the means of the reproducing device of the present invention, and the medium can be processed by a computer.

Furthermore, the data of the present invention includes a data structure, a data format, a data type and so on. Also, the medium of the present invention includes a recording medium such as ROM, a transmitting medium such as Internet, and a transmitting medium such as light, a radio wave, and a sound wave. Additionally, the medium belonging to the present invention includes a recording medium for recording programs and/or data and a transmitting medium for transmitting programs and/or data. Moreover, processability by a computer according to the present invention refers to readability by a computer in the case of a recording medium such as ROM. In the case of a transmitting medium, the processability means that programs and/or data to be transmitted can be processed by a computer as a result of transmission.

Further, a program recording medium records programs and/or data for allowing a computer to carry out all or some of the functions regarding all or some of the means of the image processing device of above-described embodiment. The program recording medium is readable by a computer and may allow the read programs and/or data to carry out the functions by cooperating with the computer.

Additionally, the information aggregate of the present invention includes software such as programs and/or data.

Moreover, a transmitting medium, which transmits an MPEG transport stream reproduced in the reproducing device of the present invention, also belongs to the present invention.

Also, a recording medium, which records an MPEG transport stream reproduced in the reproducing device of the present invention, also belongs to the present invention.

According to the foregoing description, the present invention can provide a reproducing device, a medium, an information aggregate, a transmitting medium, and a recording medium that do not cause noise even when specific pictures are extracted from AV data recorded in a hard disk.

What is claimed is:

1. A reproducing device comprising:
   input means of inputting an MPEG transport stream from a hard disk; and
   reproducing means of reproducing the inputted MPEG transport stream,
   wherein in case of reproducing a special reproduction image,
   the input means extracts an MPEG transport stream from an arbitrary position to another arbitrary position in the inputted MPEG transport stream to output the special reproduction image used for special reproduction, and
   the reproducing means reproduces the special reproduction image while detecting whether a plurality of pieces of picture data exist in one of MPEG transport packets constituting the outputted special reproduction image.

2. The reproducing device according to claim 1, further comprising packet editing means of replacing picture data other than the picture used for special reproduction with dummy data and outputting the data in case of reproducing a special reproduction image, if a front half of an MPEG transport packet of the MPEG transport packets constituting the special reproduction image, in which a plurality of pieces of picture data is detected by the reproducing means, includes the picture data other than the picture used for special reproduction.

3. The reproducing device according to claim 1 or 2, further comprising packet editing means of replacing picture data other than the picture for special reproduction with dummy data and outputting the data in case of reproducing a special reproduction image, if a rear half of an MPEG transport packet of the MPEG transport packets constituting the special reproduction image, in which a plurality of pieces of picture data is detected by the reproducing means, includes the picture data other than the picture used for special reproduction.

4. The reproducing device according to claim 1 or 2, further comprising packet editing means of making a replacement with a transport packet in which dummy data is added to the front end of the picture data used for special reproduction and a header of the transport packet is added to a front end of the dummy data and outputting the transport packet in case of reproducing a special reproduction image, if a rear half of an MPEG transport packet of the MPEG transport packets constituting the special reproduction image, in which a plurality of pieces of picture data is detected by the reproducing means, includes the picture data other than the picture used for special reproduction.

5. The reproducing device according to claim 2, wherein the dummy data is one of adaptation stuffing or user data of a header of an MPEG transport packet, stuffing or user data of an MPEG packetized elementary stream, and zero-stuffing of an MPEG elementary stream.

6. A medium computer readable recorded with a orogram executed by a computer for controlling a reproducing apparatus to perform a method comprising the steps of:
   inputting an MPEG transport stream from a hard disk; and
   reproducing the inputted MPEG transport stream,
   wherein in case of reproducing a special reproduction image,
   inputting an MPEG transport stream from a hard disk including extracting an MPEG transport stream from an arbitrary position to another arbitrary position in the inputted MPEG transport stream to output the special reproduction image used for special reproduction, and
   reproducing the inputted MPEG transport stream including reproducing the special reproduction image while detecting whether a plurality of pieces of picture data exist in one of MPEG transport packets constituting the outputted special reproduction image.

7. An information aggregate apparatus comprising a computer readable medium recorded with a program executed by a computer for performing a method comprising the steps of:
   inputting an MPEG transport stream from a hard disk; and
   reproducing the inputted MPEG transport stream,
   wherein in case of reproducing a special reproduction image,
   inputting an MPEG transport stream from a hard disk including extracting an MPEG transport stream from an arbitrary position to another arbitrary position in the inputted MPEG transport stream to output the special reproduction image used for special reproduction, and
   reproducing the inputted MPEG transport stream including reproducing the special reproduction image while detecting whether a plurality of pieces of picture data exist in one of MPEG transport packets constituting the outputted special reproduction image.

8. A method of editing MPEG data packets for special reproduction comprising the steps of:
   (a) receiving the MPEG data packets including data of at least an image A and another image B;
   (b) selecting image A for the special reproduction;
   (c) transferring each data packet that includes data of image A to a processor for special reproduction processing;
   (d) detecting a data boundary between image A and image B in one of the data packets transferred to the processor in step (c); and
   (e) replacing data of image B in the one data packet detected in step (d) with dummy data, thereby providing the one data packet to the processor for special reproduction processing that is free-of data of image B.

* * * * *

UNITED STATES PATENT AND TRADEMARK OFFICE
CERTIFICATE OF CORRECTION

PATENT NO. : 7,248,780 B2  Page 1 of 1
APPLICATION NO. : 09/822107
DATED : July 24, 2007
INVENTOR(S) : Kenichiro Yamauchi et al.

It is certified that error appears in the above-identified patent and that said Letters Patent is hereby corrected as shown below:

Cover Page

After "FOREIGN PATENT DOCUMENTS", line 3, insert -- OTHER PUBLICATIONS, Japanese Office Action for Japanese Patent Application No. 2000-094894, 09/09/2003 --.

Column 11

Line 28, "medium computer readable" should read -- computer readable medium --.

Signed and Sealed this

Sixth Day of January, 2009

JON W. DUDAS
*Director of the United States Patent and Trademark Office*